(12) United States Patent
Bi et al.

(10) Patent No.: US 6,970,439 B2
(45) Date of Patent: Nov. 29, 2005

(54) METHOD AND APPARATUS FOR INCREASING ORTHOGONAL CODE SPACE IN A CDMA RAN

(75) Inventors: Hao Bi, Wheeling, IL (US); John M. Harris, Chicago, IL (US); Alan Jette, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 29 days.

(21) Appl. No.: 10/366,433

(22) Filed: Feb. 13, 2003

(65) Prior Publication Data

US 2004/0160920 A1    Aug. 19, 2004

(51) Int. Cl.[7] ............. H04Q 7/00; H04J 11/00; H04B 7/216; H04B 14/04; H04N 11/04
(52) U.S. Cl. .............. 370/329; 370/208; 370/342; 375/240.23; 375/253
(58) Field of Search .............. 370/230, 311, 320, 370/735, 342, 441, 333; 375/135, 136

(56) References Cited

U.S. PATENT DOCUMENTS

| | | | |
|---|---|---|---|
| 6,034,971 A | | 3/2000 | Love et al. |
| 6,205,190 B1 | * | 3/2001 | Antonio et al. ............. 375/346 |
| 6,339,590 B2 | * | 1/2002 | Kim ............................ 370/331 |
| 6,487,251 B1 | * | 11/2002 | Antia et al. .................. 375/259 |
| 6,516,196 B1 | * | 2/2003 | Chen et al. .................. 455/450 |
| 6,560,292 B1 | * | 5/2003 | Lundby et al. ............. 375/259 |
| 6,618,597 B1 | * | 9/2003 | Choi ........................... 455/522 |
| 6,658,381 B1 | * | 12/2003 | Hellwig et al. ............. 704/216 |
| 6,700,881 B1 | * | 3/2004 | Kong et al. ................. 370/335 |
| 2002/0064145 A1 | * | 5/2002 | Khare et al. ................ 370/342 |
| 2002/0146029 A1 | * | 10/2002 | Kavak et al. ............... 370/441 |
| 2003/0114162 A1 | * | 6/2003 | Chheda et al. .............. 455/447 |
| 2003/0231586 A1 | * | 12/2003 | Chheda ....................... 370/230 |
| 2003/0236909 A1 | * | 12/2003 | Chu ............................ 709/232 |

OTHER PUBLICATIONS

U.S. Appl. No. 10/205,239, Harris, John M.

* cited by examiner

Primary Examiner—Hanh Nguyen
(74) Attorney, Agent, or Firm—Jeffrey K. Jacobs

(57) ABSTRACT

The present embodiments address the need for an apparatus and method that provides additional orthogonal codes without trading off RF capacity. When a system is operating near its RF capacity and running out of available orthogonal codes, one or more channels are allocated using a new radio configuration (510) that utilizes longer orthogonal codes. This new radio configuration increases the number of available orthogonal codes without sacrificing RF capacity. Instead, it reduces the peak data rate such a channel can provide.

34 Claims, 3 Drawing Sheets

| PARAMETER | DATA RATE (bps) | | | UNITS |
|---|---|---|---|---|
| | 4,800 | 2,700 | 1,500 | |
| PN CHIP RATE | 1.2288 | 1.2288 | 1.2288 | Mcps |
| CODE RATE | 1/4 | 1/4 | 1/4 | BITS/CODE SYMBOL |
| CODE SYMBOL REPETITION | 1 | 2 | 4 | REPEATED CODE SYMBOLS/ CODE SYMBOL |
| PUNCTURING RATE | 1 | 8/9 | 4/5 | MODULATION SYMBOLS/REPEATED CODE SYMBOL |
| MODULATION SYMBOL RATE | 19,200 | 19,200 | 19,200 | SPS |
| QPSK SYMBOL RATE | 9,600 | 9,600 | 9,600 | SPS |
| WALSH LENGTH | 128 | 128 | 128 | PN CHIPS |
| NUMBER OF WALSH FUNCTION REPETETIONS PER QPSK SYMBOL | 1 | 1 | 1 | WALSH FUNCTIONS/QPSK SYMBOL |
| PROCESSING GAIN | 256 | 455.1 | 819.2 | PN CHIPS/BIT |

*FIG. 4*

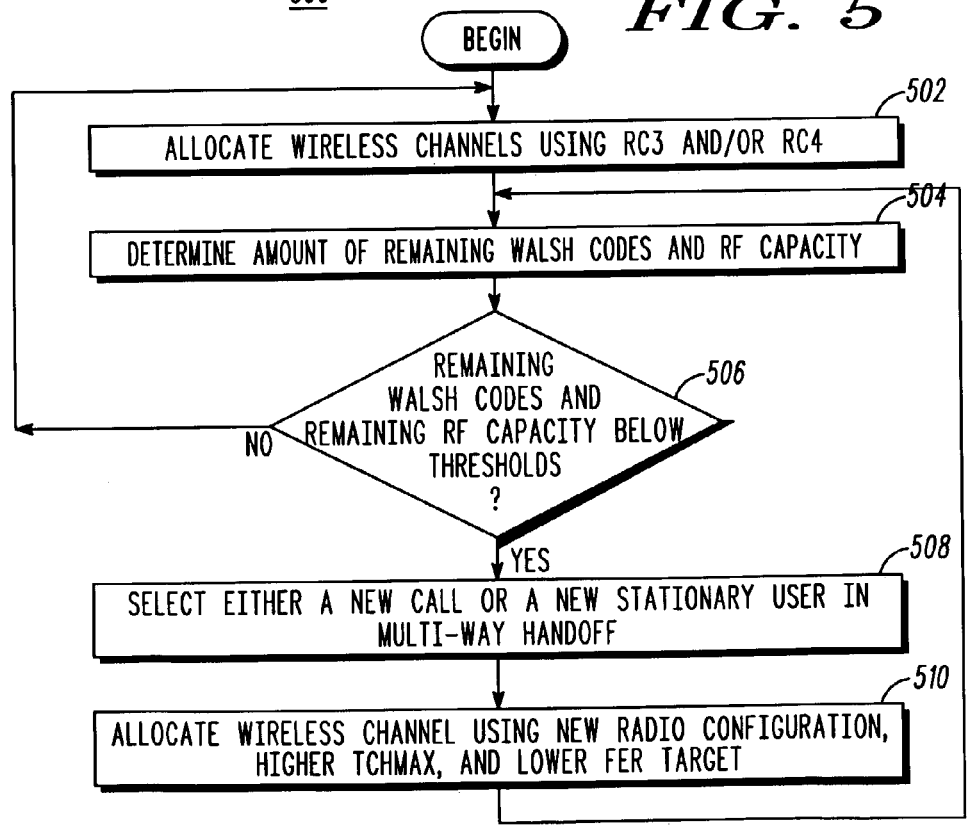

*FIG. 5*

METHOD AND APPARATUS FOR INCREASING ORTHOGONAL CODE SPACE IN A CDMA RAN

CROSS-REFERENCE TO RELATED APPLICATION

This application is related to co-pending application Ser. No. 10/205,239 entitled "Communications Resource Allocation Method And Apparatus," assigned to the assignee of the instant application and filed on Jul. 25, 2002.

FIELD OF THE INVENTION

The present invention relates generally to wireless communication and, in particular, to increasing orthogonal code space in CDMA radio access networks (RANs).

BACKGROUND OF THE INVENTION

With the introduction into IS-2000 CDMA systems of technologies such as smart antenna and Selectable Mode Vocoder (SMV), Walsh code availability has become an important system capacity issue. For example, with only 64 Walsh codes per sector, Radio Configuration (RC) 3 is Walsh code limited for the SMV and smart antenna features. One way to solve this Walsh code availability problem is to use RC4. However, RC4's capability of doubling the number of available Walsh codes is achieved at the expense of RF capacity. In fact, simulation has shown that compared to an RC3 voice call, an RC4 call would require a 1.15 dB higher signal-to-noise ratio (SNR) to achieve the same frame error rate (FER). Thus, using RC4 can lead to more than a 20% reduction in RF capacity.

The prior art proposes methods for using RC3 and RC4 together to manage the Walsh code availability in a system, but these methods effectively trade RF capacity to obtain additional Walsh codes. However, if a system is both Walsh code limited and near its RF capacity limits, these techniques can not be used. There is no RF capacity left to trade for more Walsh codes. Therefore, a need exists for a new apparatus and method that provides additional Walsh codes without trading off RF capacity.

BRIEF DESCRIPTION OF THE DRAWINGS

FIG. 4 is a table indicating modulation parameters for a radio configuration in accordance with an embodiment of the present invention.

FIG. 5 is a logic flow diagram of actions performed by a RAN in accordance with an embodiment of the present invention.

DETAILED DESCRIPTION OF EMBODIMENTS

The present embodiments address the need for an apparatus and method that provides additional orthogonal codes without trading off RF capacity. When a system is operating near its RF capacity and running out of available orthogonal codes, one or more channels are allocated using a new radio configuration that utilizes longer orthogonal codes. This new radio configuration increases the number of available orthogonal codes without sacrificing RF capacity. Instead, it reduces the peak data rate such a channel can provide.

Figure 1:
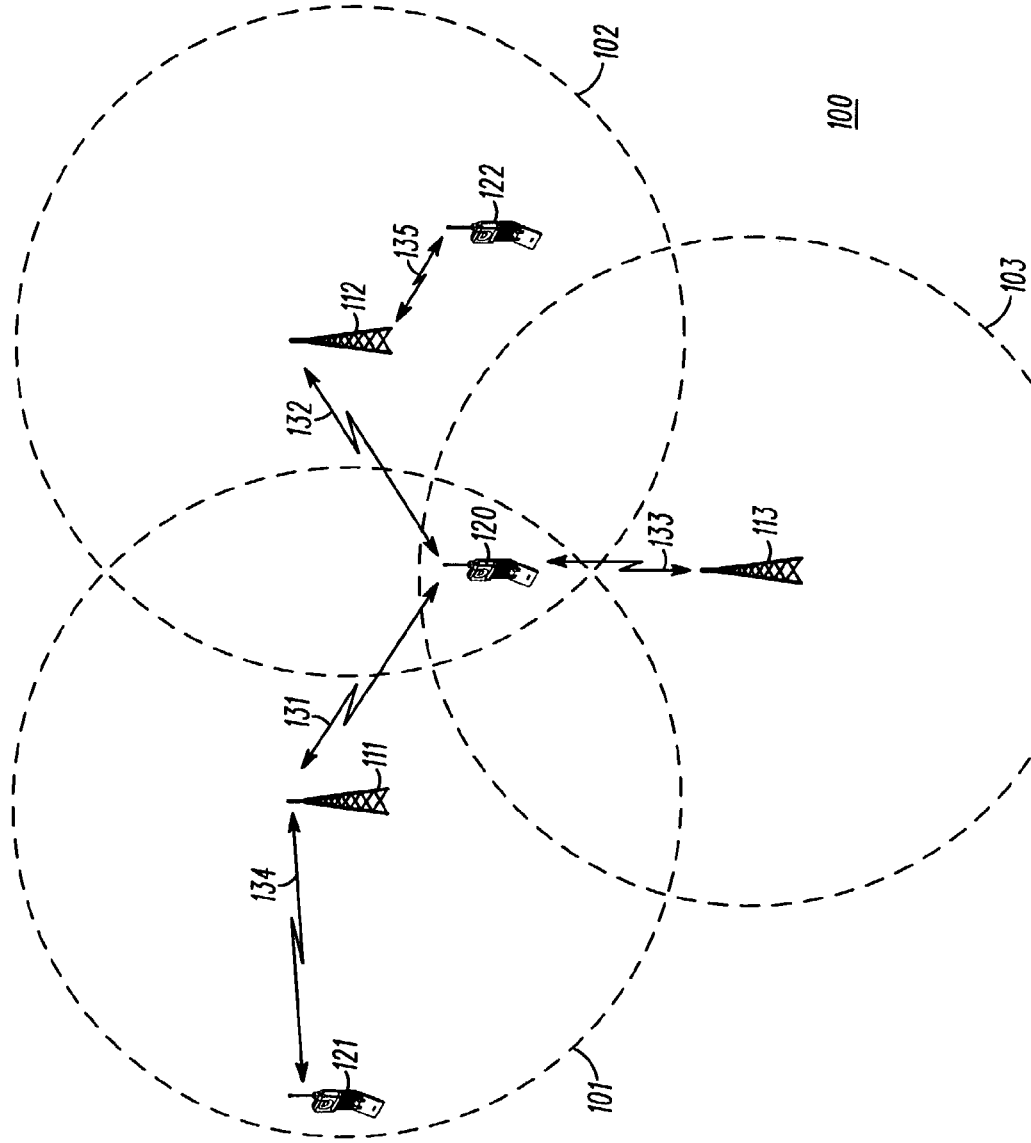
FIG. 1 is a block diagram depiction of a communication system in accordance with an embodiment of the present invention.

The present invention can be more fully understood with reference to FIGS. 1–5. FIG. 1 is a block diagram depiction of a communication system 100 in accordance with a first embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. Alternative embodiments of the present invention may be implemented in other technologies such as, but not limited to, WCDMA and UMTS.

The first embodiment of the present invention includes a radio access network (RAN) and remote units, such as mobile stations (MSs) 120–122. However, the present invention is not limited to remote units that are mobile. For example, a remote unit may comprise a desktop computer wirelessly connected to the radio access network.

Figure 2:
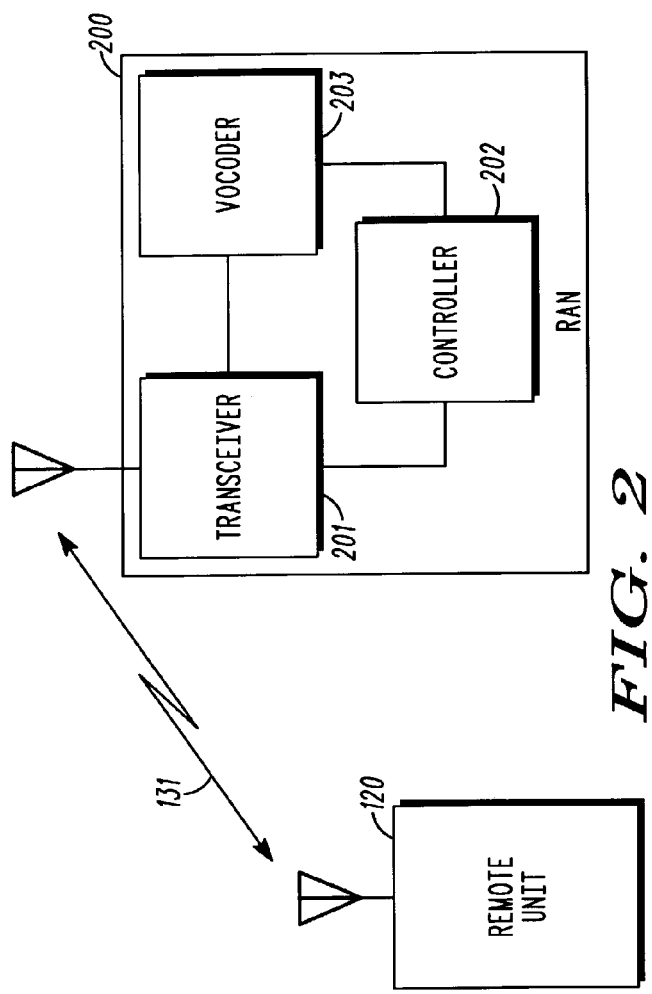
FIG. 2 is a block diagram depiction of a remote unit in communication with a RAN, the depiction in accordance with an embodiment of the present invention.

Those skilled in the art will recognize that FIG. 1 and FIG. 2 do not depict all of the network equipment necessary for system 100 to operate but only those system blocks particularly relevant to the description of embodiments of the present invention. For example, FIG. 1 only depicts base sites 111–113 and MSs 120–122, which are variously located within service coverage areas 101–103 for illustrative purposes. The MSs communicate with the base sites via CDMA 2000 air interface resources 131–135, as shown in FIG. 1.

FIG. 2 is a block diagram depiction of remote unit 120 in communication with RAN 200, the depiction in accordance with the first embodiment of the present invention. As depicted in FIG. 2, RAN 200 comprises well-known entities such as a transceiver 201, vocoder 203, and controller 202. Those skilled in the art are aware of the many ways each of these entities can be implemented and/or purchased from wireless communications companies such as "MOTOROLA." Controllers, for example, typically comprise components such as processors, memory, and/or logic circuitry designed to implement algorithms that have been expressed as computer instructions and/or in circuitry. Given an algorithm or a logic flow, those skilled in the art are aware of the many design and development techniques available to implement a controller to perform the given logic.

Typically, RAN transmitters and receivers are components of RAN base transceiver stations (BTSs), which interface with other RAN devices such as base site controllers, mobile switching centers/virtual location registers (MSCNLR), home location registers (HLR), etc. In a first embodiment of the present invention, a known CDMA 2000 RAN is adapted using known telecommunications design and development techniques to implement the RAN aspect of the present invention. The result is RAN 200, which performs the method described with respect to FIG. 5. Those skilled in the art will recognize that the RAN aspect of the present invention may be implemented in and across various physical components of RAN 200, including physical components that are not even co-located.

Operation of multiple embodiments of the present invention occurs substantially as follows. Transceiver 201 of RAN 200 transmits and receives CDMA signaling to and from remote unit 120 via allocated wireless channels that are depicted as CDMA air interface resource 131. When allocating wireless channels, controller 202 determines whether the number of available orthogonal codes (Walsh codes, e.g.) is below a code threshold and whether the amount of unallocated RF capacity is below a capacity threshold. In the first embodiment, the code threshold would be set to approximately ten orthogonal codes and the capacity threshold would be approximately 20% of the cell's RF capacity (as inferred from the ratio of the total cell's transmit power to the pilot power). So long as both of these are not below each's respective threshold, controller 202 allocates wireless channels using one or more known radio configurations such as RC3 and/or RC4. Thus, an orthogonal code space of a particular size is produced.

However, when both the available number of orthogonal codes and the amount of unallocated RF capacity are below the code threshold and the capacity threshold, controller 202 allocates wireless channels using a new radio configuration. Since this new radio configuration utilizes orthogonal codes longer than at least some of the orthogonal codes otherwise used, the orthogonal code space is increased. In the first embodiment, the new radio configuration has an orthogonal code size of 128, although in alternative embodiments, this code size may be 256.

Figure 3:
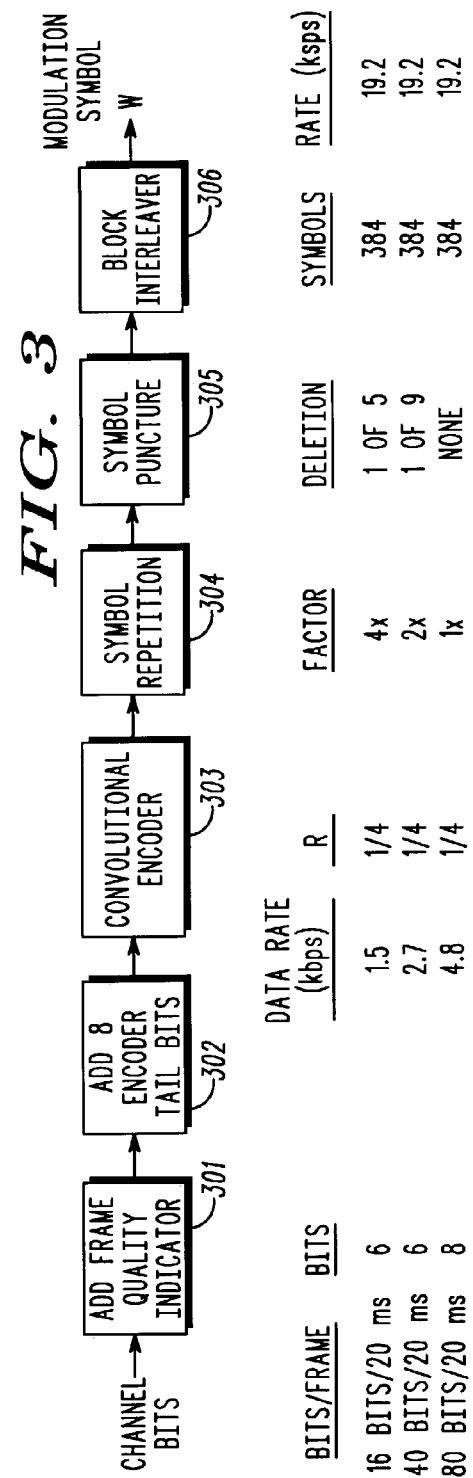
FIG. 3 is a block diagram depiction of the physical layer operational blocks for a radio configuration in accordance with an embodiment of the present invention.

FIG. 3 is a block diagram depiction of the physical layer operational blocks for the new radio configuration, and FIG. 4 is a table indicating modulation parameters for the new radio configuration, both FIGs. in accordance with the first embodiment of the present invention. In the first embodiment, the new radio configuration utilizes an SMV vocoder, and specifically, SMV half-rate-max encoding modes 4 and 5. With SMV modes 4 and 5, there are three types of input frames, namely half-rate, quarter-rate, and eighth-rate. Their sizes are 80, 40, and 16 bits per 20 ms, respectively. The operation blocks in FIG. 3, Add Frame Quality Indicator 301, Add 8 Encoder Tail Bits 302, Convolutional Encoder 303, Symbol Repetition 304, Symbol Puncture 305, and Block Interleaver 306, correspond to the likewise-named cdma2000 blocks as defined in the "Physical Layer Standard for cdma2000 Spread Spectrum Systems, Release C, May 2002."

As compared to RC3, the symbol repetition factor for the new radio configuration is reduced from 2, 4, 8 to 1, 2, 4 for half-rate, quarter-rate, and eighth-rate frames, respectively (see the modulation parameters of table 400). Walsh codes of size 128, instead of 64, can thus be used for orthogonal spreading. As previously noted, this has the effect of increasing the size of the Walsh code set from the 64 codes of RC3 to the 128 codes of the new radio configuration. Notably, since the tradeoff in the first embodiment only involves the repetition factor and spreading factor, there is no loss of channel coding gain as there is between RC4 and RC3.

As compared to RC4, the new radio configuration has a lower channel coding rate, ¼ instead of ½ (although in alternative embodiments the code rate may be two code symbols for each bit encoded, i.e. ½), and reduced repetition factors, 1, 2, and 4 instead of 2, 4, and 8. Since convolutional coding is more efficient than simple repetition in terms of forward error correcting, the new radio configuration requires lower received SNR for a given FER than RC4 requires. Therefore, the new radio configuration provides greater RF utilization than RC4.

In sum, the new radio configuration captures both RC3's advantage of increased RF utilization and RC4's advantage of increased Walsh codes. Thus, the new radio configuration increases system voice capacity through efficient use of both the RF capacity and Walsh code space. However, the new radio configuration achieves these benefits at the expense of a channel's peak data rate. In the first embodiment, the peak data rate for such a channel is approximately four kilobits per second (kbps). Hence, a user using a new radio configuration channel will likely experience a reduced voice quality as compared to using an RC3 or RC4 channel, for example. Voice quality or data throughput, then, is traded off in the first embodiment in order to increase the orthogonal code space.

When controller 202 determines that both the available number of orthogonal codes and the amount of unallocated RF capacity are below the code threshold and the capacity threshold, controller 202 can allocate a wireless channel using the new radio configuration by either allocating a wireless channel for a new call or by selecting an existing call to switch to a channel that uses the new radio configuration. To use the new radio configuration for data calls, controller 202 allocates a fundamental channel in half-rate-max mode, and for voice calls, controller 202 allocates a channel vocoded in a half-rate-max mode.

Because voice quality may be diminished when the new radio configuration is used, a number of considerations may be incorporated into the call selection function to either maximize the benefits or minimize the negative effect on users. For example, in the first embodiment, controller 202 preferentially selects a call, whether new or existing, based on a determination that a remote unit involved in the call is substantially stationary and is involved in a multi-way handoff, such as a three-way handoff. Remote unit 120, is depicted in FIG. 1 as being involved in a three-way handoff. Thus, a call involving remote unit 120 is preferentially selected for switchover to the new radio configuration, since by decreasing the voice quality of this one call, the Walsh code load across base sites 111–113 is reduced. The same Walsh code benefit would require the reduction of voice quality in three separate calls if non-handoff calls are selected instead.

Other call selection preferences that may be implemented in alternative embodiments, individually or in particular combinations, are discussed below. The RAN may preferentially select a call based on a determination that call activity for at least a portion of the call is low. For example, a data call experiencing a lull in data transfer or a dispatch call involving a listening mode user may be selected. The RAN may preferentially select a call based on a determination that the call involves a voice mail server or a voice messaging application. Since both of these involve recording voice for later delivery rather than real-time voice, reduced voice quality may be less annoying to users.

The RAN may also preferentially select a call based on a determination that the call involves a cell that is approaching its reverse link RF capacity, involves a remote unit with an above-average, reverse-link transmit power, or involves a remote unit with a low battery level. Switching to the new radio configuration has an additional benefit of reducing reverse link power requirements and thereby freeing up reverse link resources, since the call's data rate is reduced. Remote unit 121, is depicted in FIG. 1 as being far from base site 111's tower and thus likely using a relatively high level of reverse link power. Selecting the call involving remote unit 121 would allow remote unit 121 to reduce its reverse link power and conserve its battery. This would be particularly beneficial if remote unit 121's battery was low.

Although somewhat contrary to selection criteria focused on RF utilization, the RAN may select a call based on a determination that the call has a lowest overall frame error rate (FER). Calls which have lower FER will have a better mean opinion score (MOS), so even though their vocoder mode may be reduced to half-rate-max, their voice quality may still remain fairly good. Thus, this selection approach emphasizes improving half-rate-max voice quality instead of improving RF utilization.

Additionally, the RAN can optionally choose to increase the maximum transmit power (TCHMAX) and/or lower the FER target of each call that is selected to use the new radio configuration. Either may improve the MOS of a particular call. So although this will increase the transmit power and thus increase the RF costs of the call, the switch from, for example, RC3 SMV Mode 3 to the new radio configuration (SMV half-rate-max) with lower FER may actually improve both the MOS and the RF impact.

FIG. 5 is a logic flow diagram of actions performed by a RAN in accordance with the first embodiment of the present invention. The operation of the first embodiment can be summarized with reference to logic flow 500. The RAN allocates (502) wireless channels using one or more known radio configurations such as RC3 and RC4 while also determining (504) the amount of Walsh code and RF resources that remain unallocated. The RAN continues allocating wireless channels using known radio configuration(s) until (506) the remaining Walsh code and RF resources both drop below their respective thresholds. When both are below their respective thresholds; the RAN selects (508) either a new call or an existing call, preferentially involving a stationary user in 3-way handoff, and allocates (510) a wireless channel using the new radio configuration for this call. Thus, providing additional Walsh codes without trading off RF capacity.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity, and have not necessarily been drawn to scale. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for increasing orthogonal code space in a CDMA radio access network (RAN) comprising:
   allocating wireless channels using a group of radio configurations to produce an orthogonal code space based on the group of radio configurations;
   determining how many orthogonal codes remain unallocated to produce a number of remaining codes;
   determining how much RF capacity remains unallocated to produce remaining RF capacity; and
   when the number of remaining codes is less than a code threshold and the remaining RF capacity is less than a capacity threshold, allocating at least one wireless channel using a new radio configuration, wherein the new radio configuration is not a member of the group of radio configurations.

2. The method of claim 1, wherein orthogonal codes comprise Walsh codes.

3. The method of claim 1, wherein the group of radio configurations consists of one member and wherein the one member is RC3.

4. The method of claim 1, wherein the group of radio configurations comprises RC4.

5. The method of claim 1, wherein the new radio configuration utilizes orthogonal code of length 128 and a convolution code with a coding ratio of ¼.

6. The method of claim 1, wherein the new radio configuration comprises an orthogonal code size of 256.

7. The method of claim 1, wherein the new radio configuration comprises a half-rate-max encoding mode.

8. The method of claim 7, wherein the new radio configuration comprises Selectable Mode Vocoder (SMV) mode 4 encoding.

9. The method of claim 7, wherein the new radio configuration comprises Selectable Mode Vocoder (SMV) mode 5 encoding.

10. The method of claim 1, wherein the new radio configuration comprises a symbol repetition factor of 1 for half-rate frames.

11. The method of claim 1, wherein the new radio configuration comprises a symbol repetition factor of 2 for quarter-rate frames.

12. The method of claim 1, wherein the new radio configuration comprises a symbol repetition factor of 4 for eighth-rate frames.

13. The method of claim 1, wherein the new radio configuration comprises a peak source data rate of approximately four kilobits per second (kbps).

14. The method of claim 1, wherein the new radio configuration comprises a code rate of four code symbols for each bit encoded.

15. The method of claim 1, wherein the new radio configuration comprises a code rate of two code symbols for each bit encoded.

16. The method of claim 1, wherein allocating at least one wireless channel using the new radio configuration comprises selecting a call.

17. The method of claim 16, wherein allocating at least one wireless channel using the new radio configuration comprises allocating a wireless channel for the call using the new radio configuration, wherein the call is a new call.

18. The method of claim 16, wherein the call is supported by a wireless channel that uses a radio configuration from the group of radio configurations.

19. The method of claim 18, wherein allocating at least one wireless channel using the new radio configuration comprises switching the call to a wireless channel that uses the new radio configuration.

20. The method of claim 19, wherein switching the call to a wireless channel that uses the new radio configuration comprises switching a fundamental channel of the call to a half-rate-max mode if the call is a data call.

21. The method of claim 19, wherein switching the call to a wireless channel that uses the new radio configuration comprises switching a vocoder mode to a half-rate-max mode if the call is a voice call.

22. The method of claim 16, wherein selecting the call supported by a wireless channel that uses the radio configuration from the group of radio configurations comprises selecting the call based on a determination that a remote unit involved in the call is substantially stationary.

23. The method of claim 16, wherein selecting the call supported by a wireless channel that uses the radio configuration from the group of radio configurations comprises selecting the call based on a determination that a remote unit involved in the call is involved in a multi-way handoff.

24. The method of claim 23, wherein selecting the call based on a determination that a remote unit involved in the call is involved in a multi-way handoff comprises selecting the call based on a determination that a remote unit involved in the call is involved in a three-way handoff.

25. The method of claim 16, wherein selecting the call supported by a wireless channel that uses the radio configuration from the group of radio configurations comprises selecting the call based on a determination that call activity for at least a portion of the call is low.

26. The method of claim 16, wherein selecting the call supported by a wireless channel that uses the radio configuration from the group of radio configurations comprises selecting the call based on a determination that the call involves a voice mail server.

27. The method of claim 16, wherein selecting the call supported by a wireless channel that uses the radio configuration from the group of radio configurations comprises selecting the call based on a determination that the call involves a voice messaging application.

28. The method of claim 16, wherein selecting the call supported by a wireless channel that uses the radio configuration from the group of radio configurations comprises selecting the call based on a determination that the call involves a cell that is approaching its reverse link RF capacity.

29. The method of claim 16, wherein selecting the call supported by a wireless channel that uses the radio configuration from the group of radio configurations comprises selecting the call based on a determination that the call involves a remote unit with an above-average, reverse-link transmit power.

30. The method of claim 16, wherein selecting the call supported by a wireless channel that uses the radio configuration from the group of radio configurations comprises selecting the call based on a determination that the call involves a remote unit with a low battery level.

31. The method of claim 16, wherein selecting the call supported by a wireless channel that uses the radio configuration from the group of radio configurations comprises selecting the call based on a determination that the call has a lowest overall frame error rate (FER).

32. The method of claim 1, further comprising increasing a maximum transmit power for the at least one wireless channel using the new radio configuration.

33. The method of claim 1, further comprising lowering a frame error rate (FER) target for the at least one wireless channel using the new radio configuration.

34. A radio access network (RAN) comprising:
 a CDMA transceiver adapted to transmit and receive signaling via allocated wireless channels; and
 a controller, communicatively coupled to the CDMA transceiver,
  adapted to allocate wireless channels using a group of radio configurations to produce an orthogonal code space based on the group of radio configurations,
  adapted to determine how many orthogonal codes remain unallocated to produce a number of remaining codes,
  adapted to determine how much RF capacity remains unallocated to produce remaining RF capacity, and
  adapted to allocate at least one wireless channel using a new radio configuration when the number of remaining codes is less than a code threshold and the remaining RF capacity is less than a capacity threshold, wherein the new radio configuration is not a member of the group of radio configurations.

* * * * *